Patented Jan. 28, 1930

1,744,867

UNITED STATES PATENT OFFICE

MELVILLE FULLER COOLBAUGH AND JOHN BURNS READ, OF GOLDEN, COLORADO, ASSIGNORS TO COMPLEX ORES RECOVERIES COMPANY

METHOD OF ROASTING ORES AND MINERALS

No Drawing.  Application filed June 13, 1924. Serial No. 719,911.

This invention relates to the roasting of sulphide ores and minerals preliminary to smelting, and has for its object the rapid and efficient elimination of sulphide sulphur and the production of oxides and sulphates and other highly oxidized products which lend themselves readily to sintering and smelting. While this method is applicable to all types of roasting where the elimination of sulphide sulphur is required, it is of especial advantage in roasting complex sulphide ores and concentrates containing zinc, lead, copper and iron preliminary to lead smelting.

In outline the roasting is accomplished as follows: The material to be roasted or desulphidized is carried along with the air for roasting and the gases formed by the roast while maintaining a high temperature and throughly mixing or rabbling the material. In general practice sulphides are given a countercurrent roast to eliminate a portion of the sulphide sulphur preliminary to sintering and smelting. During the sintering more of the sulphide sulphur is eliminated to bring the sulphur content down to the requirements of the blast furnace. Some sulphur is necessary in the blast furnace charge for the formation of matte to collect the copper.

When a complex ore carrying zinc is roasted as above, the sulphide sulphur will remain with the zinc as zinc sulphide and will enter the blast furnace as such. Not all of this sulphur will be taken up by the iron, lead and copper in the formation of the matte, but some will remain as zinc sulphide and form zinc sponge or mush which is a solid at the temperature of the furnace and collects between the matte and the slag. This sponge carries values in precious metals and copper, is difficult to separate from the slag and must be recovered, re-roasted, sintered and smelted.

When zinc goes to the blast furnace as zinc oxide, it enters the slag and does not react with the sulphur present to form zinc sulphide. As a result there is no zinc sponge and the expense of smelting is reduced.

The present process has three important features:

First, it provides a very efficient and economical method of roasting sulphide minerals by rabbling the highly oxidized particles formed on the surface of the charge into the charge where an interaction takes place with sulphide particles whereby sulphur dioxide gas is evolved.

Second, it produces oxides and sulphates and other highly oxidized products which have a distinct advantage for sintering preliminary to smelting.

Third, it insures the virtual absence of zinc sulphide in the calcine, thus eliminating zinc sponge from the blast furnace, thereby reducing blast furnace costs.

To operate this method of roasting successfully it is necessary to understand some of the thermal effects, as well as the major chemical reactions involved. When the ore is charged into the furnace the iron sulphides begin to react readily with the air, and, if the temperature is not too high (450–550° C.) form ferric oxide ($Fe_2O_3$) and ($SO_2$) sulphur dioxide. Next the lead, copper and zinc sulphides will begin to react with air, forming metallic oxides and sulphur dioxide. Ferric oxide in the presence of oxygen will react catalytically upon the sulphur dioxide and form sulphur trioxide ($SO_3$) with the liberation of heat. Sulphur trioxide in the presence of such metallic oxides as lead, zinc and copper will interact with them, forming sulphates, also with the liberation of heat. Ferric oxide has the property of absorbing much sulphur dioxide and oxygen at temperatures of 450–550° C. and at higher temperatures (above 550° C.) giving off sulphur trioxide. When highly oxidized compounds such as sulphates (especially lead, zinc and copper) sulphur trioxide or ferric oxide are brought in contact with sulphide minerals in the bed of the charge, an interaction takes place with the formation of oxides of the metals and sulphur dioxide.

The following are the principal chemical reactions involved for the iron and zinc compounds:

$2FeS_2$ plus $11O = Fe_2O_3$ plus $4SO_2$.
$Fe_2O_3$ plus $O$ plus $SO_2 = SO_3$ plus $Fe_2O_3$.
$ZnS$ plus $3O = ZnO$ plus $SO_2$.
$ZnO$ plus $SO_3 = ZnSO_4$.
$3Fe_2O_3$ plus $ZnS = 6FeO$ plus $ZnO$ plus $SO_2$.
$3ZnSO_4$ plus $ZnS = 4ZnO$ plus $4SO_2$.

There are of course similar reactions involved for the lead and copper sulphide minerals.

From the above chemical reactions it becomes very apparent that oxidation of the sulphide mineral is taking place not only from the surface of the charge but from the interior of the charge where the oxidized mineral comes in contact with the sulphide or unoxidized mineral and as a result a complete elimination of sulphide sulphur is quickly effected.

So long as the minerals and gases are moved together and in the same direction it is immaterial what type of furnace is used. For instance the furnace may be horizontal or vertical or one inclined from the horizontal or vertical as may prove of advantage. The furnace which has been used for proving the process is a vertical one of the super-imposed hearth type.

The highly oxidized product obtained from the roast lends itself readily to both sintering and smelting. The calcine is sintered by mixing with raw sulphides or matte and treating in a Dwight Lloyd sintering machine or in Huntington Heberlein pots. The amount of sulphide added will depend entirely upon the oxidizing power of the calcine. Enough excess sulphur should be added to insure the correct sulphur content in the blast furnace. If it is desirable to keep entirely away from zinc sulphide in the blast furnace then raw sulphides of lead, copper or iron, and not a material carrying zinc sulphide, should be used to mix with the calcine preliminary to sintering.

The chemistry of the sintering as regards the elimination of sulphur is very similar to that of roasting:

$3Fe_2O_3$ plus $PbS = PbO$ plus $6FeO$ plus $SO_2$.
$3ZnSO_4$ plus $PbS = PbO$ plus $3ZnO$ plus $4SO_2$.

A simple sulfide mineral containing either copper, lead or zinc is desulfidized efficiently within the temperature ranges specified above. The most efficient temperature will vary for each mineral and combination of minerals, as well as the time for roasting. The calcine from simple sulfides may go directly to reverberatory furnaces without mixing with other sulfides, or without sintering.

By roasting as previously outlined and then sintering the calcine, a distinct saving results due to the fact that only a portion of the original sulphide mineral need be given a preliminary roast and that a product will result which will be free from zinc sulphide.

No zinc sulphide means no zinc sponge in the blast furnace, and a saving due to reduced metal losses and a reduction in material re-roasted, sintered and smelted.

It is evident that no definite temperatures for roasting, proportion of air to ore, or proportion of raw sulphide to mix with the calcine preliminary to sintering can be given since all of these factors will vary with the composition of the material to be treated.

A complex ore containing 10% lead, 25% zinc, 15% iron, 5% copper and 30% sulphur required thirty to fifty cubic feet of air, measured at standard conditions, per lb. of ore. The temperatures range from 450° C. for the beginning of desulfidization up to a maximum of 950° C. The most desirable temperature from an operating standpoint and for the efficient elimination of sulphide sulphur lies between 650° C. and 800° C.

The time required for roasting ranges between two and twelve hours depending upon the temperatures employed. The quantity of such sulphide mixed with the calcine preliminary to sintering is such that the charge will contain 6–15% of total sulphur. In sintering operation the sulphur will be roasted down to two to five per cent, depending upon the grade of matte desirable to produce. The sinter is smelted in the lead blast furnace in the usual manner.

What we claim is:—

1. A process of treating sulphide ores preliminary to further treatment which comprises subjecting the said ores to a preliminary roasting in the presence of air by causing the ores and air to travel in the same direction and subjecting them to a sufficiently high temperature to create oxidized compounds, and then sintering the said oxidized compound to prepare them for a further treatment adapted to recover the values of the ores.

2. A process of treating sulphide ores preliminary to further treatment which comprises subjecting the said ores to a preliminary roasting in the presence of air by causing the ores and air to travel in the same direction and subjecting them to a sufficiently high temperature to create oxides and sulphates and then sintering the said oxides and sulphates to prepare them for smelting, and then smelting the sintered product.

3. A process of treating sulphide ores preliminary to further treatment which comprises subjecting the said ores to a preliminary roasting in the presence of air by causing the ores and air to travel in the same direction while subjecting them to a sufficiently high temperature to create oxides and sulphates and after the formation of the said oxides and sulphates, mixing therewith further quantities of sulphide ore to prepare the roasted product for sintering, sintering the said product and thereafter treating the sintered material to extract the values therefrom.

4. A process of treating sulphide ores preliminary to further treatment, which comprises subjecting the said ores to a preliminary roasting in the presence of air by causing the ores and air to travel in the same direction and subjecting them to sufficiently high temperature to create oxides and sulphates, adding to the said oxides and sulphates zinc-free, sulphide ores, thereby forming a mixture highly adapted for sintering, sintering the said mixture to prepare it for smelting and then smelting the sintered mixture.

5. A process of treating sulphide ores containing zinc preliminary to further treatment which comprises subjecting the ores to a preliminary roasting in the presence of air by causing the ores and air to travel in the same direction and subjecting them to a sufficiently high temperature to form zinc oxide and sulphates preliminary to sintering, sintering the said zinc oxide and sulphates, thereby preparing product suitable for smelting, and smelting the said product.

6. A process of smelting sulphide ores containing zinc which comprises subjecting the said ores to a preliminary roasting in the presence of air by causing the ores and air to travel in the same direction and subjecting them to a sufficiently high temperature to form zinc oxide and sulphates, mixing with the said zinc oxide and sulphates a further quantity of untreated ore to form a mixture highly adaptable for sintering, sintering the mixture to form a product readily adapted for smelting, and then smelting the said product.

7. A process of treating sulphide ores preliminary to further treatment which comprises subjecting the said ores to a preliminary roasting in the presence of air by causing the ores and air to travel in the same direction, while subjecting them to temperatures ranging substantially between 450° C. and 950° C., thereby creating oxides and sulphates readily amenable for sintering, sintering the said oxides and sulphates preliminary to smelting, and then smelting the sintered product.

In testimony whereof, we affix our signatures.

MELVILLE FULLER COOLBAUGH.
JOHN BURNS READ.